(12) United States Patent
Plummer (10) Patent No.: US 7,976,029 B2
(45) Date of Patent: Jul. 12, 2011

(54) AIRPLANE TRAILER

(75) Inventor: Richard T. Plummer, St. George Island, FL (US)

(73) Assignee: Richard T. Plummer, St. George Island, FL (US)

( * ) Notice: Subject to any disclaimer, the term of this patent is extended or adjusted under 35 U.S.C. 154(b) by 148 days.

(21) Appl. No.: 12/432,390

(22) Filed: Apr. 29, 2009

(65) Prior Publication Data
US 2010/0276897 A1 Nov. 4, 2010

(51) Int. Cl.
*B60G 11/26* (2006.01)
*B60P 1/00* (2006.01)

(52) U.S. Cl. .................. 280/6.151; 280/414.1; 414/589

(58) Field of Classification Search .............. 280/6.151, 280/6.157, 414.1, 43.17, 43.18; 244/129.1; 414/589; 180/19.2
See application file for complete search history.

(56) References Cited

U.S. PATENT DOCUMENTS

| | | | | |
|---|---|---|---|---|
| 3,785,678 A | * | 1/1974 | Shearer | 280/491.3 |
| 4,232,879 A | * | 11/1980 | Boxrud | 280/656 |
| 4,714,265 A | * | 12/1987 | Franklin | 280/491.4 |
| 5,083,892 A | * | 1/1992 | Oswald et al. | 414/458 |
| 5,104,279 A | * | 4/1992 | Melnick | 414/428 |
| 5,165,706 A | * | 11/1992 | Fond | 280/414.1 |
| 5,549,436 A | * | 8/1996 | Fresia | 414/426 |
| 5,607,176 A | * | 3/1997 | Leib et al. | 280/656 |
| 6,341,793 B2 | * | 1/2002 | Braun | 280/414.1 |
| 6,390,759 B1 | | 5/2002 | Novak et al. | |
| 6,431,557 B1 | | 8/2002 | Terborn et al. | |
| 6,454,284 B1 | | 9/2002 | Worman, Jr. | |
| 6,517,089 B2 | | 2/2003 | Phillis et al. | |
| 6,530,580 B1 | | 3/2003 | Simpson | |
| 6,619,673 B2 | | 9/2003 | Eckelberry et al. | |
| 6,851,734 B2 | | 2/2005 | Findley | |
| 6,857,643 B2 | | 2/2005 | Neider | |
| 6,923,452 B1 | | 8/2005 | Zachmeier et al. | |
| 6,959,932 B2 | | 11/2005 | Svartz et al. | |
| 7,131,651 B2 | | 11/2006 | Laursen | |
| 7,153,080 B2 | | 12/2006 | Schmidt | |
| 7,192,033 B2 | | 3/2007 | Bolt et al. | |
| 7,237,779 B2 | | 7/2007 | Kondo et al. | |
| 7,261,287 B2 | | 8/2007 | Gehret | |
| 7,306,239 B2 | | 12/2007 | Schutt et al. | |
| 7,322,627 B1 | | 1/2008 | Nicholson | |
| 7,401,794 B2 | | 7/2008 | Laurent et al. | |
| 7,407,166 B2 | | 8/2008 | Briesemeister et al. | |
| 2001/0008333 A1 | | 7/2001 | McKenzie et al. | |
| 2001/0024021 A1 | | 9/2001 | Allen et al. | |
| 2002/0113382 A1 | | 8/2002 | Dosdall | |
| 2002/0117816 A1 | | 8/2002 | Dudding et al. | |
| 2002/0190486 A1 | | 12/2002 | Phillis et al. | |

(Continued)

*Primary Examiner* — Paul N. Dickson
*Assistant Examiner* — George D. Spisich
(74) *Attorney, Agent, or Firm* — IPLM Group, P.A.

(57) ABSTRACT

A trailer having a frame movable between a raised position, suitable for towing of the airplane on a roadway, and a lowered position, allowing the airplane wheels to be in contact with a common surface with the trailer wheels when the trailer is under the airplane. A hitch assembly, suitable for towing the trailer in a closed position with the frame in the raised position, is coupled to the front of the frame. The open position allows the airplane to be loaded/unloaded on land from the front of the frame when the frame is in the lowered position. The airplane may be loaded/unloaded from the rear of the frame when the airplane trailer is placed in water. Also, a method of loading the airplane onto the trailer from the rear in water and unloading the airplane from the front on land.

13 Claims, 12 Drawing Sheets

U.S. PATENT DOCUMENTS

| | | |
|---|---|---|
| 2003/0057663 A1 | 3/2003 | Trescott |
| 2003/0085536 A1 | 5/2003 | Lang et al. |
| 2004/0051261 A1 | 3/2004 | Yakimishyn |
| 2004/0070157 A1 | 4/2004 | Boice |
| 2004/0217561 A1 | 11/2004 | Kondo et al. |
| 2005/0067799 A1 | 3/2005 | Smith |
| 2005/0082772 A1 | 4/2005 | Humley |
| 2005/0173163 A1* | 8/2005 | Hammonds .................. 180/6.5 |
| 2006/0001223 A1 | 1/2006 | Krieger |
| 2006/0017240 A1 | 1/2006 | Laurent et al. |
| 2006/0103083 A1 | 5/2006 | Connors |
| 2006/0125198 A1 | 6/2006 | Choi |
| 2006/0175775 A1 | 8/2006 | Bolt et al. |
| 2006/0186616 A1 | 8/2006 | Rudiger |
| 2007/0145696 A1 | 6/2007 | Ramsey |
| 2007/0170685 A1 | 7/2007 | Chalin et al. |
| 2007/0187919 A1 | 8/2007 | Furman |
| 2007/0210539 A1 | 9/2007 | Hakui et al. |
| 2007/0267840 A1 | 11/2007 | Sandbulte et al. |
| 2007/0290461 A1 | 12/2007 | Oscarsson |
| 2007/0290473 A1 | 12/2007 | Buma |
| 2008/0018065 A1 | 1/2008 | Hirao et al. |
| 2008/0252025 A1 | 10/2008 | Plath |
| 2008/0276851 A1* | 11/2008 | Weed et al. .................. 114/44 |
| 2009/0084635 A1* | 4/2009 | Hammonds .................. 187/401 |
| 2009/0309328 A1* | 12/2009 | Gionta et al. ............. 280/414.3 |

* cited by examiner

AIRPLANE TRAILER

FIELD

The present invention relates generally to devices and methods of transporting an airplane from water to land and vice versa, and particularly from a towable trailer.

BACKGROUND

It is often desirable to transport water vehicles such as boats, personal watercraft and amphibious aircraft among different bodies of water by way of roads, or to withdraw such vehicles from the water, for instance, in anticipation of the water freezing. The transportation of water vehicles from land to water and vice versa is well known. Trailers which may be towed behind road vehicles to facilitate transportation with such water vehicles are also well known.

It is also known to transport other kinds of vehicles, such as land vehicles and aircraft, by road by loading them onto towable trailers. Small aircraft, for instance, may be towed on roads by placing them on trailers. Even land vehicles which may be perfectly capable of driving efficiently on roads may be loaded onto trailers and towed in order to, for instance, realize efficiencies in transportation or reduce vehicle wear and tear during transportation.

The ICON A5™ Amphibious Light Support Aircraft is designed and produced by ICON Aircraft. As an amphibious aircraft, the ICON A5 is configured to float on the water and to extend retractable wheels and roll on land. In order to protect the aircraft from weathering, it may be desirable to maintain the ICON A5 out of the water except during actual use, generally in an aircraft hanger, garage, or similar structure.

Traditional aircraft trailers for amphibious aircraft have been configured to be backed into water to allow the aircraft to float off and on the trailer. When the aircraft is to be taken off of the trailer on land to roll or rest on its own wheels, however, the aircraft may need to be physically lifted off of the trailer. The positioning of the wheels on the airframe of the ICON A5 may not be sufficiently wide to allow them to sit on the outside of the frame of the trailer, thereby constraining the wheels by the frame of the trailer itself. Moreover, the wheels on the ICON A5 may not deploy so low that they support the aircraft on the ground while the aircraft is positioned on the trailer even if the wheels were positioned outside of the frame of the trailer. Thus, because the aircraft wheels would not support the aircraft while the aircraft is on the trailer, and even if the wheels could support the aircraft, the wheels could not roll out of the frame, the aircraft may not be able to be placed on or removed from the trailer without additional equipment to, for instance, lift the aircraft off of the trailer.

SUMMARY

A trailer has been designed for use with water vehicles generally and amphibious aircraft in particular to facilitate the placement and removal of the aircraft from water, while also permitting the aircraft to roll off of and on to the trailer on its own wheels when on land. The trailer may be backed into the water down, for instance, a standard boat launch, and the amphibious aircraft floated over the rear or side of the trailer and secured to the trailer. With the aircraft secured, the trailer may be driven straight out of the water and to aircraft hanger, garage, or similar structure. Once at its destination the trailer may be unhitched from the towing vehicle, the aircraft wheels may be lowered and the trailer placed in a lowered and open configuration to allow the wheels of the amphibious aircraft to contact the ground and an open path for the amphibious aircraft to roll on its own wheels. If the trailer is positioned outside of the hanger or garage, the aircraft may roll directly into shelter. The aircraft may then be flown from a conventional airport using the aircraft's wheels. If the trailer was backed into the hanger or garage, the aircraft may be rolled off of the front of the trailer, facilitating maintenance or repositioning to an alternative structure, for instance.

In particular, a connecting mechanism between the trailer frame and the suspension allows for the frame to be raised and lowered, allowing for the aircraft wheels to come into contact with the ground and support the weight of the aircraft. Further, the lowered position of frame allows the airplane/trailer combination to enter or be stored in structures with a lower ceiling or door opening than would otherwise be the case. In addition, to permit the aircraft to then be rolled off of the trailer, a hitch assembly at the front of the trailer may be moved from a closed position, from which it may be utilized by another vehicle to tow the trailer, to an open position, in which the hitch is moved out of the way to give the wheels of the aircraft a clear path to allow the aircraft to roll over or out of the trailer.

As a result, no additional equipment may be needed to place an amphibious aircraft on the trailer or take the amphibious aircraft off the trailer while on land. Moreover, additional effort or strain may be minimized in such an operation, as manhandling of the aircraft may be minimized. These advantages may be realized while maintaining essential functionalities of the trailer itself, in particular providing the ability to hitch the trailer to a towing vehicle, drive the trailer to water, place the trailer in water and allow the amphibious aircraft to float off of the trailer, particularly off of the back.

In an embodiment, the present invention provides a trailer for an airplane having a flotation hull and retractable airplane wheels. Trailer wheels are mounted with respect to a trailer suspension. A connecting mechanism operatively couples a frame having a front and a rear to the trailer suspension. The connecting mechanism allows the frame to be moved between a raised position of the frame relative to the trailer wheels and a lowered position of the frame relative to the trailer wheels. The raised position is suitable for towing the airplane on the airplane trailer on a roadway. The lowered position is suitable for allowing the airplane wheels to be in contact with a common surface with the trailer wheels when the trailer is under the airplane. A hitch assembly having a closed position and an open position is coupled to the front of the frame. The closed position is suitable for towing the trailer with the frame in the raised position. The open position allowing the airplane to be loaded/unloaded on land from the front of the frame when the frame is in the lowered position. The trailer being constructed such that the airplane may be loaded/unloaded from the rear of the frame when the airplane trailer is placed in water.

In an embodiment, the hitch assembly is movable to the open position.

In an embodiment, the hitch assembly is movable to a first side of the frame to the open position.

In an embodiment, the hitch assembly is pivotally coupled to the frame.

In an embodiment, the hitch assembly has a first arm pivotally coupled to the frame and a second arm pivotally coupled to the frame and detachably attached to the first arm, wherein the first arm and the second arm are movable to the open position when the first arm is detached from the second arm.

In an embodiment, the frame has a second side, and wherein the first arm is movable to the first side to the open position and the second arm is movable to the second side to the open position.

In an embodiment, the hitch assembly comprises an arm pivotally coupled to the frame movable to a side of the frame to the open position.

In an embodiment, the connecting mechanism has a piston pivotally coupled to the frame and providing a piston force, a suspension lever operatively coupled to the trailer suspension and a transfer lever pivotally operatively coupled to the piston and pivotally coupled to the suspension lever. The frame moves between the raised position and the lowered position due to an action of the piston force on the transfer lever.

In an embodiment, the piston is a hydraulic piston.

In an embodiment, the frame is at least eight (8) inches higher above the trailer wheels in the raised position compared with the lowered position.

In an embodiment, the connecting mechanism operates independently of the trailer suspension.

In an embodiment, a raised performance of the trailer suspension with the frame in the raised position approximately equals a lowered performance of the trailer suspension with the frame in the lowered position.

In an embodiment, the trailer suspension may consist of one or more torsion axles.

In an embodiment, the airplane has retractable wheels and the airplane wheels are in contact with a common surface with the trailer wheels when the frame is in the lowered position and the retractable wheels are in an extended position.

In an embodiment, the raised position is suitable for towing the airplane on the airplane trailer on a roadway when the retractable wheels of the airplane are in a retracted position.

In an embodiment, the retractable wheels of the airplane interfere with loading/unloading of the airplane from the front of the trailer when the retractable wheels are in the extended position and the hitch assembly is in the closed position.

In an embodiment, the retractable wheels of the airplane clear the hitch assembly during loading/unloading of the airplane from the front of the trailer when the retractable wheel are in the extended position and the hitch assembly is in the open position.

In an embodiment, the present invention provides a method of loading/unloading an airplane having retractable airplane wheels and a flotation hull on to/off of a trailer. The trailer has a frame having a front and a rear and a hitch assembly operatively coupled to the front of the frame, the hitch assembly having an open position and a closed position. The frame is movable between a raised position and a lowered position. If loading, the frame is moved to the lowered position. The hitch assembly is moved to an open position. Then, the airplane is rolled on the retractable airplane wheels over the trailer from the front of the frame. The hitch assembly is moved to a closed position. The frame is moved into the raised position. Then, the retractable wheels of the airplane are retracted. If unloading, all of the preceding steps are performed in the opposite order with extension of the retractable aircraft wheels instead retracting the aircraft wheels.

In an embodiment, the present invention provides a method for loading from water and unloading from land an airplane having retractable airplane wheels and a flotation hull using a trailer having a frame having a front and a rear and a hitch assembly operatively coupled to the frame, the hitch assembly having an open position and a closed position. The frame is movable between a raised position and a lowered position. The trailer is placed into water. The airplane with the retractable airplane wheels in a retracted position is floated over the frame from the rear of the frame. Then, the trailer is pulled out of the water. If the frame is in the lowered position, the frame is moved to the raised position. The airplane is transported on the trailer. The retractable wheels are extended to an extended position. The frame is moved to the lowered position. The hitch assembly is moved to the open position. Then, the airplane is rolled off of the trailer on the retractable airplane wheels over or out of the front of the frame.

DESCRIPTION

It is often advantageous to provide a trailer for moving water vehicles such as amphibious aircraft into and out of the water. While such water vehicles may be able to be maintained in the same body of water for extended periods of time, it may be inconvenient or potentially damaging to leave them in the same body of water indefinitely. A trailer on which the water vehicle may be secured while in the water and moved onto land allows for the water vehicle to be moved on land.

However, because of the limitations of conventional trailers, amphibious vehicles such as amphibious aircraft, which have an ability to move about on water and land, may not be efficiently utilized due to a difficulty or outright inability to remove the amphibious vehicle from the trailer. A trailer has been developed to allow for what may be an easier procedure to allow for the removal and replacement of an amphibious aircraft on land.

Figure 1:
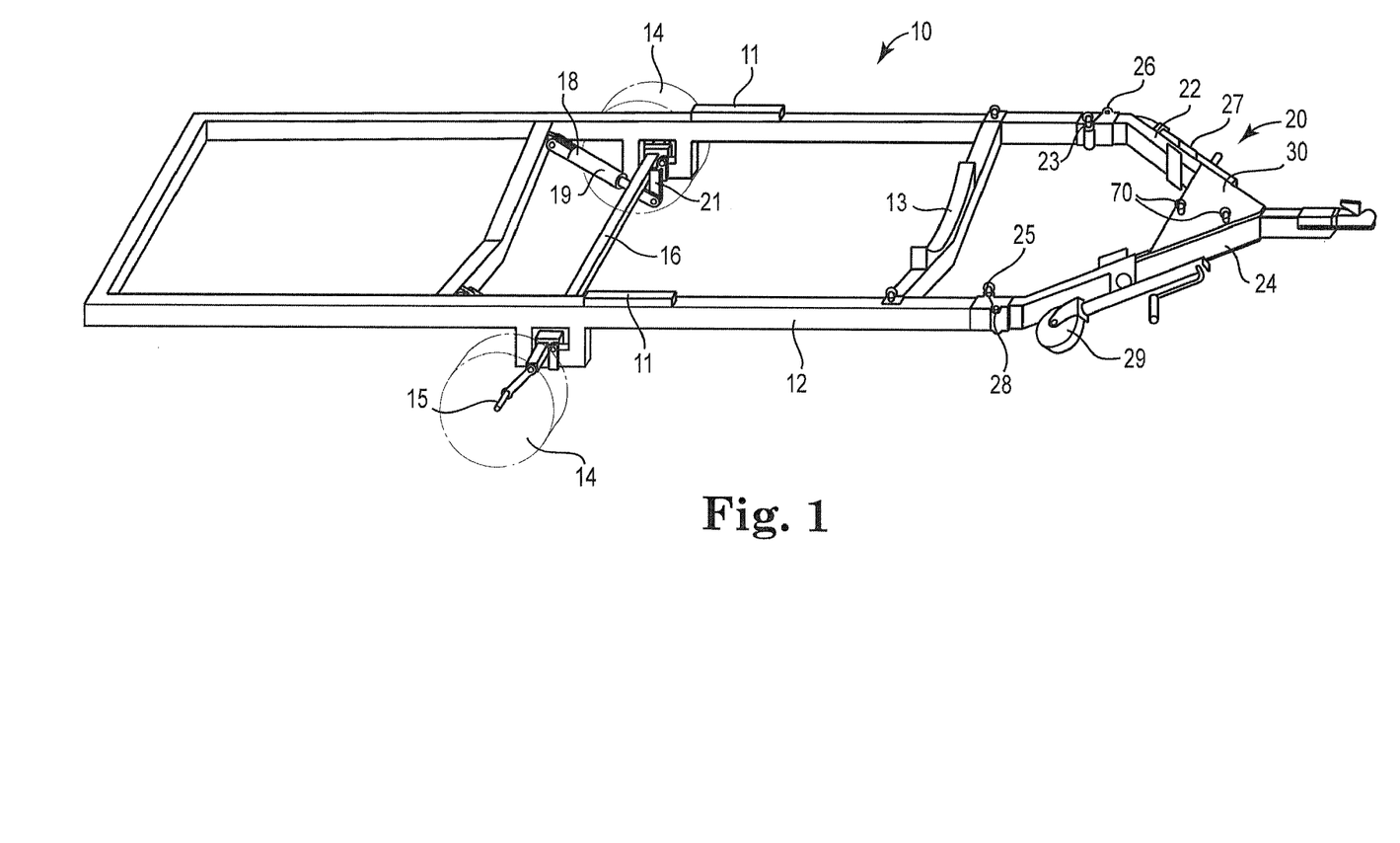
FIG. 1 shows a trailer for a water vehicle.

An embodiment of a trailer is shown in FIG. 1. Trailer 10 may be built primarily around frame 12. Support structure 13 combines with support pads 11 to support an amphibious aircraft. Support structure 13 is removable from frame 12 to allow for removal of the amphibious aircraft from trailer 10. Support structure 13 and support pads 11 may be repositioned or reconfigured to support particular kinds of amphibious aircraft or other types of water vehicles. Trailer wheels 14 may allow for trailer to move easily on land, particularly on conventional roads. Wheels 14 may also be configured to support trailer 10 on boat launches and other similar structures designed to facilitate the transition of water vehicles from trailers to water or from water to trailer. Wheels 14 are coupled to trailer suspension 16 by way of spindles 15. In various embodiments, trailer suspension 16 may be one or more torsion axles. Alternative embodiments may utilize any suitable suspension article known in the art.

Figure 5:
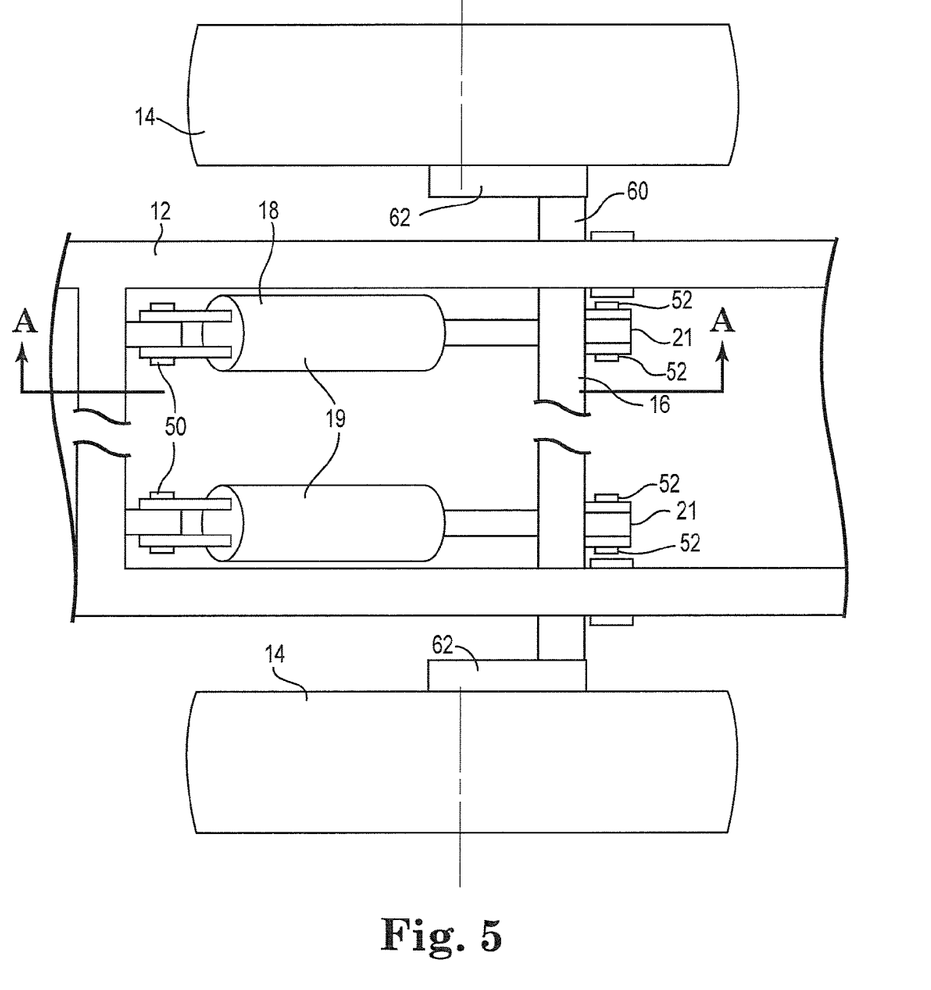
FIG. 5 is a top view of trailer suspension and connecting mechanism.
Figure 6A:
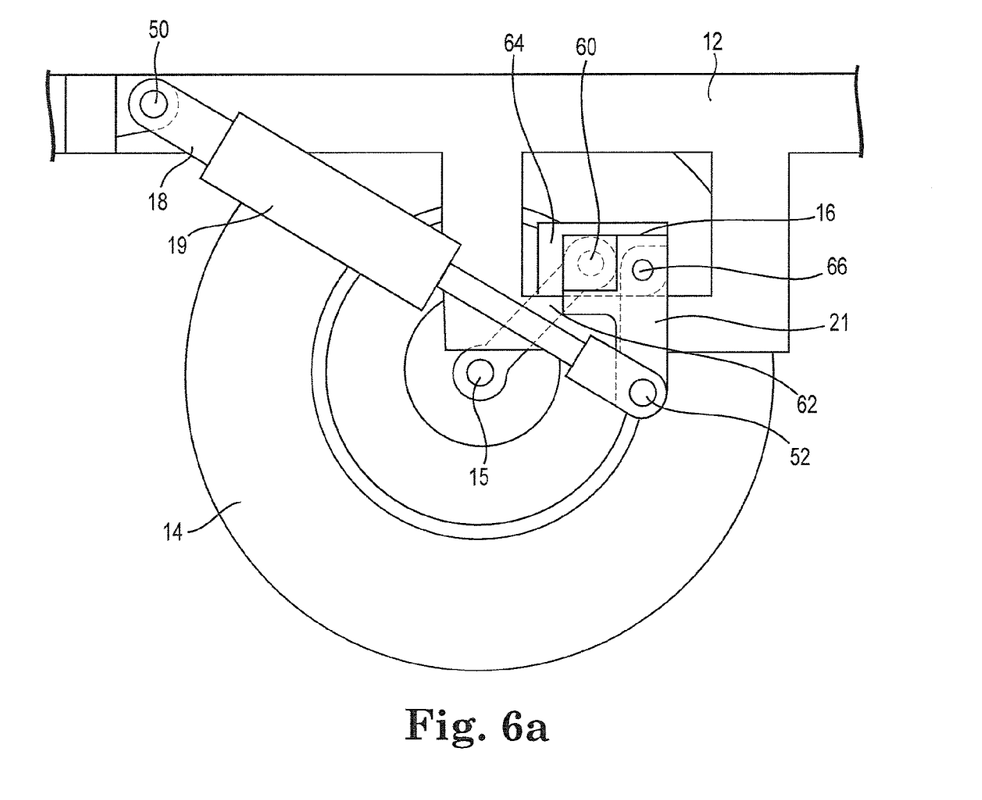
FIGS. 6a-6c are side views of a trailer suspension and connecting mechanism illustrating a transition from a raised position to a lowered position.
Figure 6B:
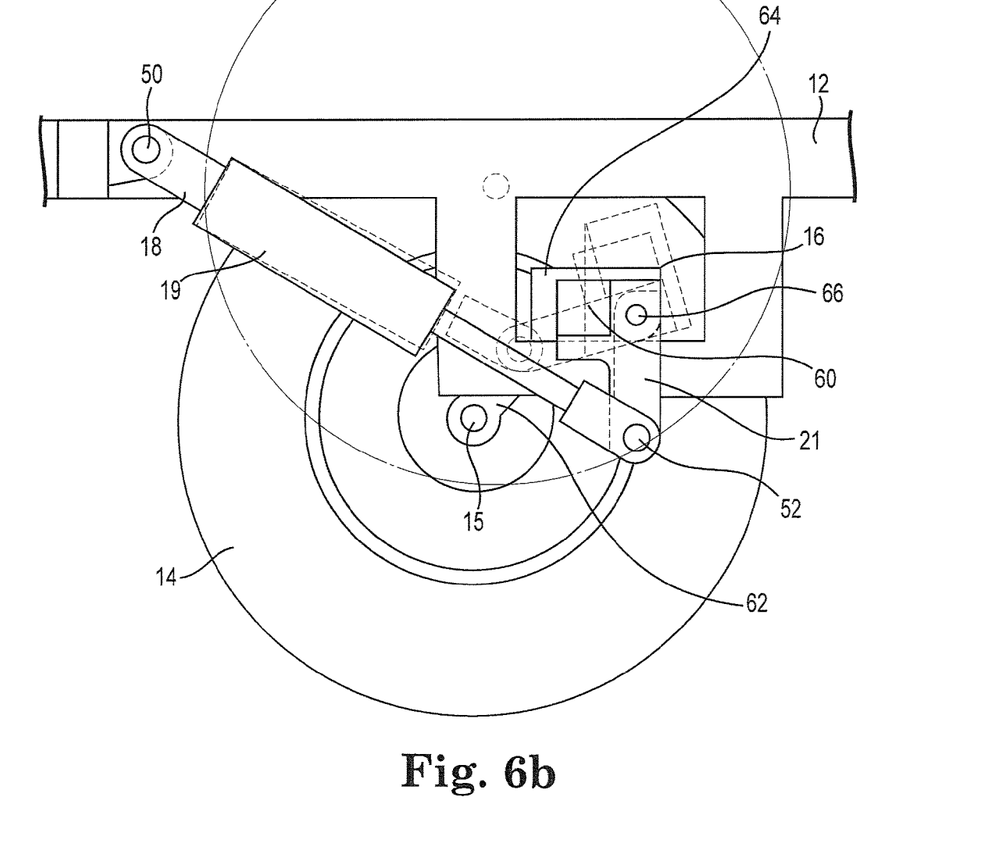
Figure 6C:
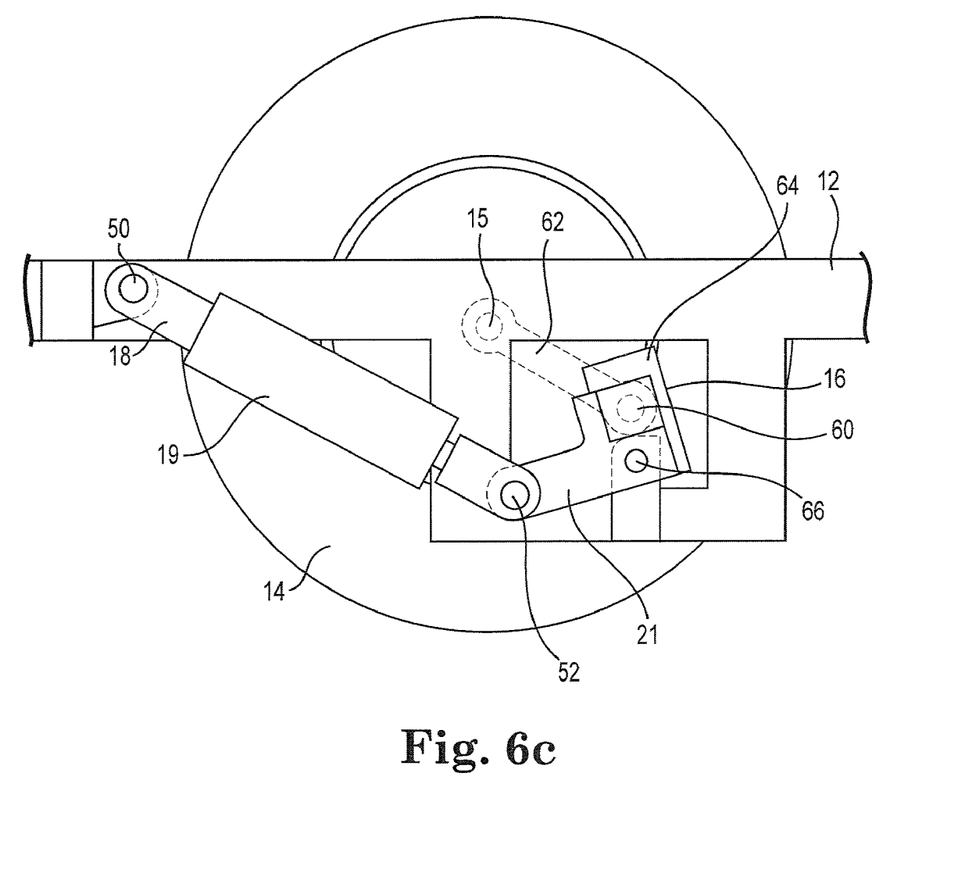
Figure 7:
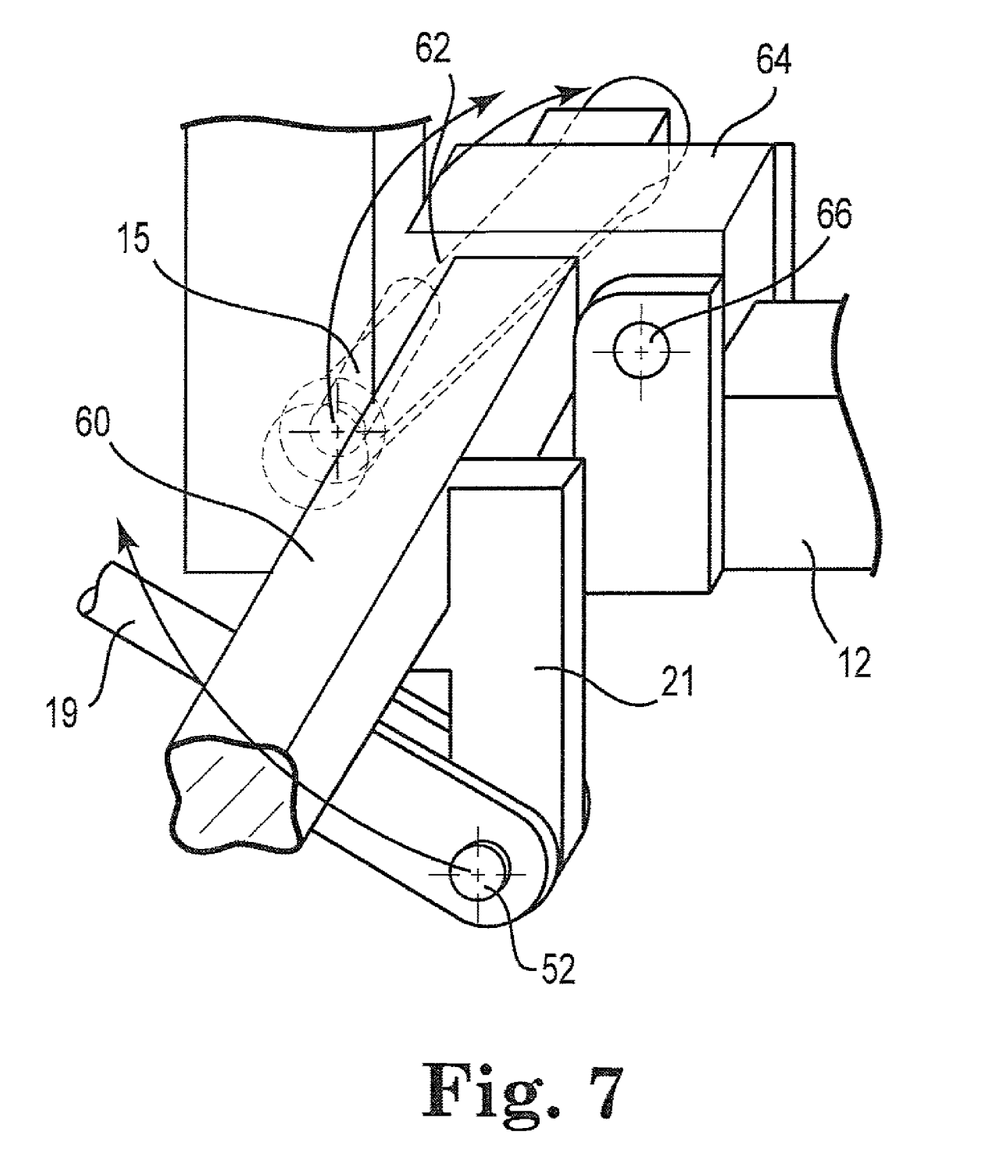
FIG. 7 is a perspective view of a trailer suspension and connecting mechanism.

Trailer suspension 16 is coupled to frame 12 by way of connecting mechanism 18, detailed in FIGS. 5-7. Connecting mechanism 18 may be built primarily around a device configured to raise and lower frame 12 relative to a surface contacted by wheels 14. In the illustrated embodiment, connecting mechanism 18 is built around a piston 19 coupled to one or more levers 21. Alternative embodiments of trailer suspension 16 are envisioned.

Figure 8:
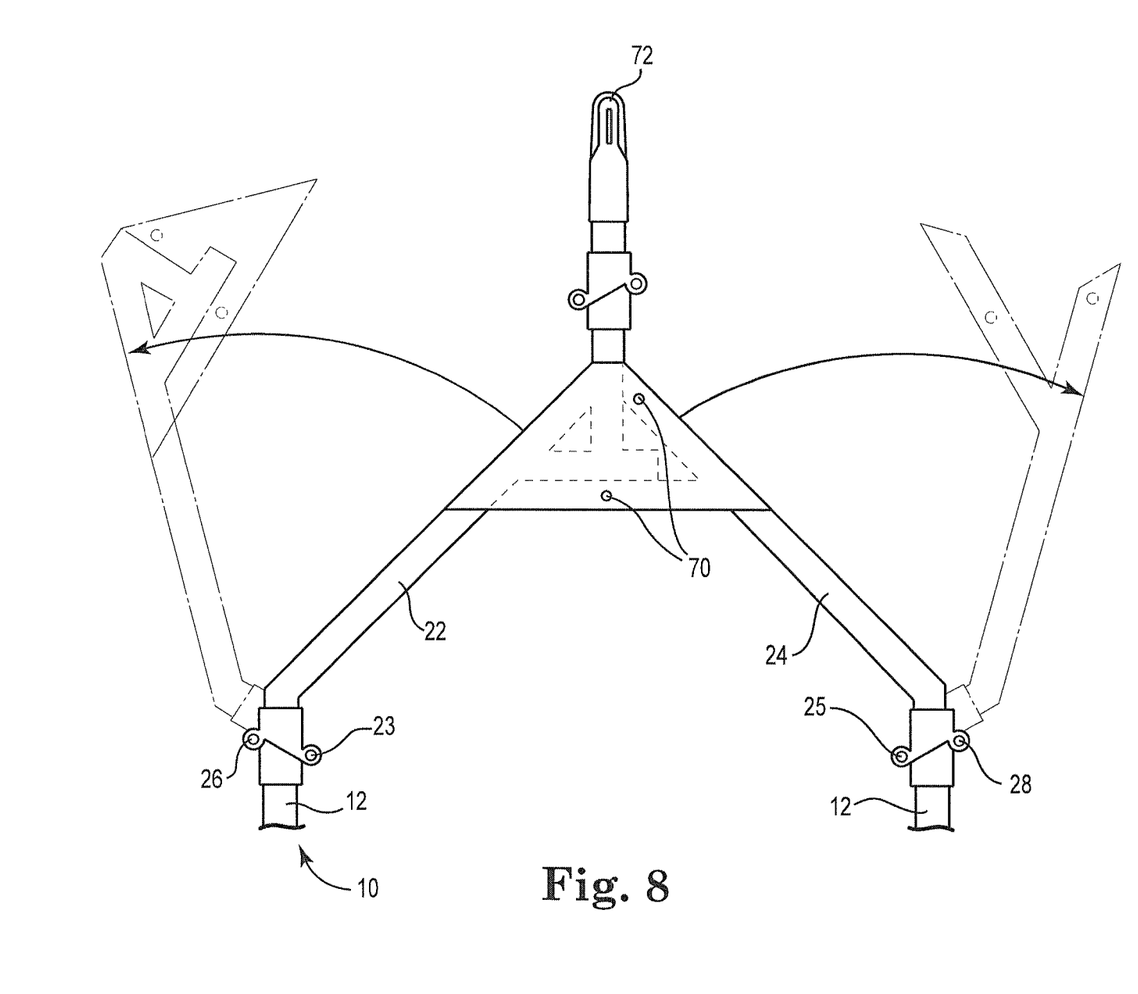
FIG. 8 is a top view of a hitch assembly.

Trailer hitch 20 is illustrated in a closed position, and is detailed in FIG. 8. In the illustrated embodiment, trailer hitch 20 is Y-shaped. Alternative embodiments, such as T-shapes and bars that simply span the gap created in frame 12, are also envisioned. As illustrated, hitch arms 22, 24 are pivotally attached to frame 12 at joints 26, 28. Hitch arms 22, 24 are separably connected at junction 30 and allowed to swing open by way of joints 26, 28. In alternative embodiments, joint 26 may be a separable junction and junction 30 may be inseparable, configuring hitch 20 to swing to an open position only on joint 28. Alternatively, joint 26 may be a separable junction and junction 30 may be a pivot joint, allowing an open position for hitch 20 to involve folding arm 24 against frame 12 and arm 22 against arm 24 in the manner of an articulated member. Support wheels 27, 29 may be deployed to support the front of trailer 10.

Figure 2:
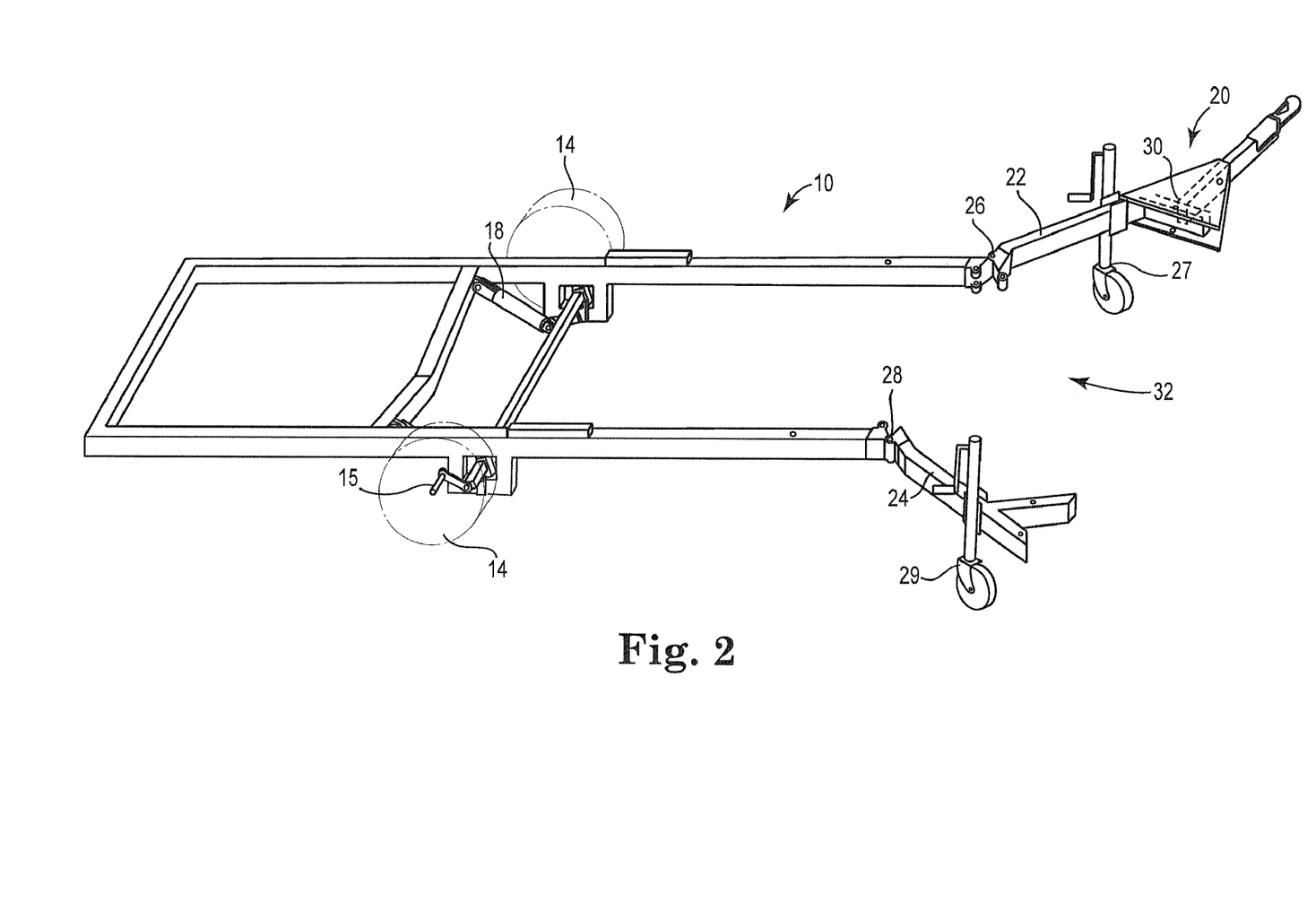
FIG. 2 shows the trailer of FIG. 1 in a lowered position and with a hitch assembly in an open position.

FIG. 2 shows trailer 10 in a configuration to allow for an aircraft to roll on and off through open trailer hitch 20 of trailer 10 supported by the aircraft's wheels. Connecting mechanism 18 is in a lowered position, raising the position of wheels 14 with respect to frame 12 and lowering frame 12 relative to a surface on which wheels rest. In an embodiment, this lowering may allow wheels of a water vehicle, in particular an amphibious aircraft, to come into contact with the ground. Impediments to independent movement of the amphibious aircraft may then be removed. As illustrated, support structure 13 has been removed. In addition, trailer hitch 20 has been moved to an open configuration by releasing junction 30 and pivoting arms 22, 24 about pivots 26, 28. Combined, these adjustments to trailer 10 may allow a water vehicle positioned on trailer 10 with deployed wheels in contact with the ground forward of trailer suspension 16 to roll through of open front 32 of trailer 10.

Figure 3:
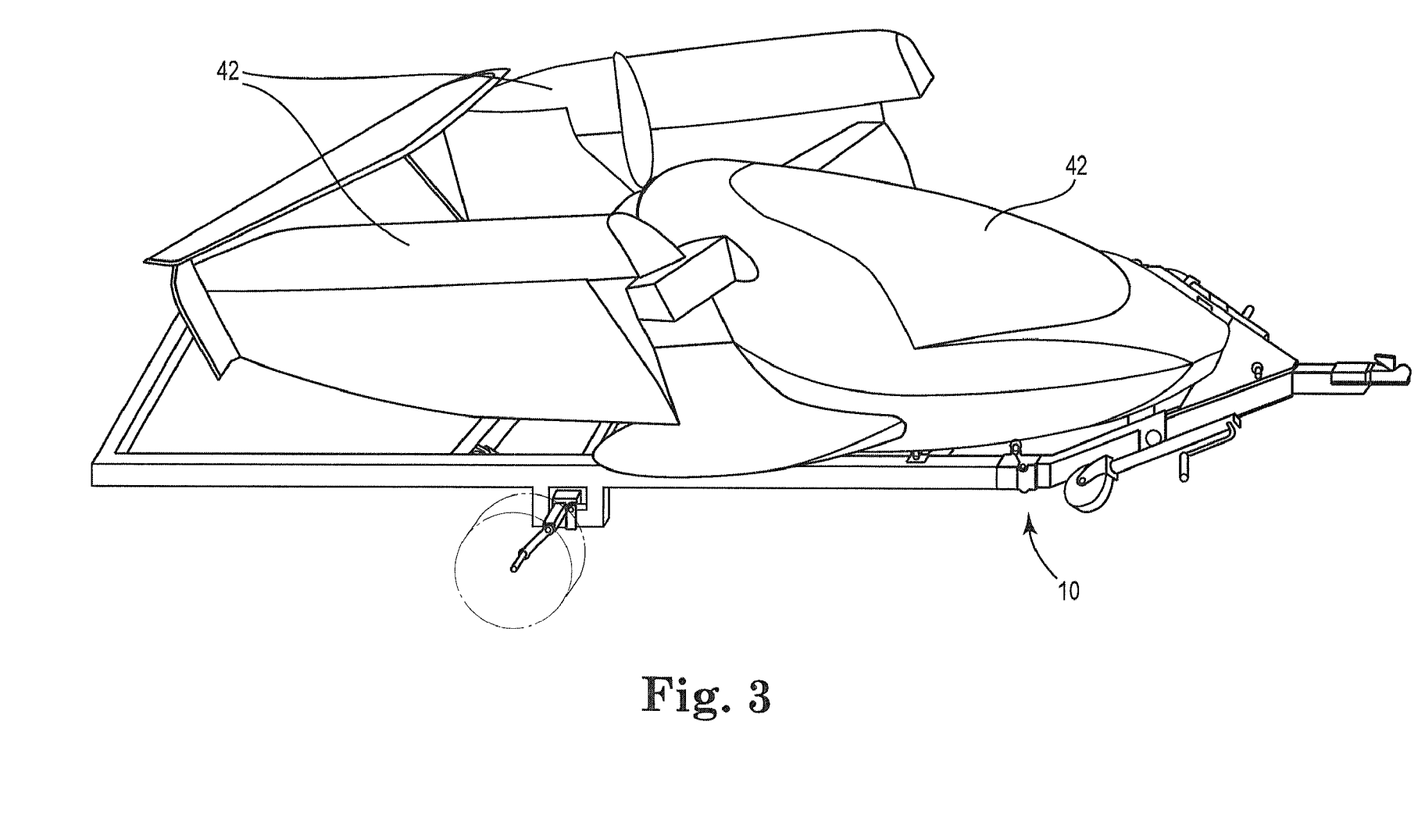
FIG. 3 shows the trailer of FIG. 1 with an amphibious aircraft on the trailer.

FIG. 3 illustrates amphibious aircraft 40, as illustrated an ICON A5 amphibious aircraft, positioned on trailer 10. Trailer 10 is in the configuration consistent with the configuration of FIG. 1. Both trailer 10 and amphibious aircraft 40 are configured for travel on land or onto a structure for positioning amphibious aircraft 40 in water. Amphibious aircraft 40 does not have deployed wheels, and wings 42 are folded back for transportation. In such a configuration, if trailer 10 is hitched to a towing vehicle, trailer 10 and amphibious aircraft 40 may be towed on a road or other suitable surface efficiently and safely.

Figure 4:
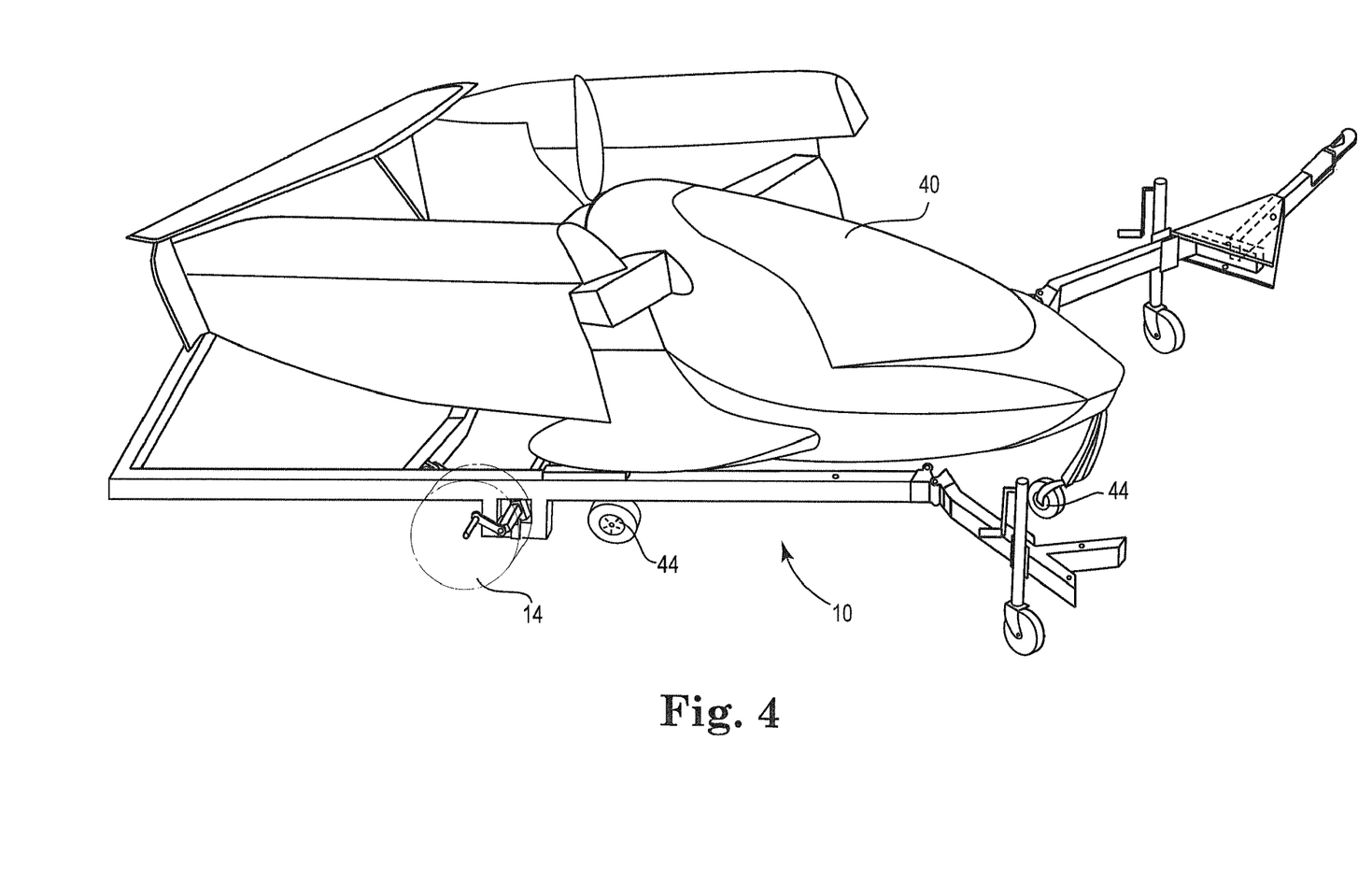
FIG. 4 shows the trailer as in FIG. 2 with an amphibious aircraft on its aircraft wheels over the trailer in a lowered position.

FIG. 4 illustrates amphibious aircraft 40 positioned over trailer 10, with trailer 10 and amphibious aircraft 40 both configured to allow amphibious aircraft 40 to roll through of front 32 of trailer 10. Trailer 10 is in a configuration consistent with that illustrated in FIG. 2. Wheels 44 of amphibious aircraft 40 have been deployed and are in contact with a surface due to moving frame 12 of trailer 10 to a lowered position. The removal of support structure 13 and the opening of trailer hitch 20 allow for a clear path for amphibious aircraft 40 to roll forward without obstruction.

FIG. 5 shows a close-up, top view of trailer suspension 16 and connecting mechanism 18. In the illustrated embodiment, connecting mechanism is comprised of a pair of pistons 19. In alternative embodiments, only one piston 19 is utilized. In alternative embodiments, more than two pistons 19 are utilized. In the illustrated embodiment, pistons 19 are coupled to frame 12 by way of pivots 50. In alternative embodiments, pistons 19 do not pivot with respect to frame 12. In the illustrated perspective, a portion of connecting mechanism 18 is obscured. However, pistons 19 are coupled to those obscured portions by way of pivots 52.

Likewise obscured from the illustrated perspective is the coupling of connecting mechanism 18 to trailer suspension 16. In an embodiment, torsion axle 60 is coupled to torsion arms 62 after passing underneath frame 12. Torsion arms are rotationally coupled to wheel hub spindles 15 (obscured), onto which wheels 14 are rotationally coupled.

FIGS. 6a-6c illustrate a transition from a raised to a lowered position of trailer suspension 16 and connecting mechanism 18 from a side view from the A-axis shown in FIG. 5. As illustrated in FIG. 6a, wheels 14, trailer suspension 16 and connecting mechanism 18 are in their lowered position while frame 12 is raised relative to spindle 15. In FIG. 6b, the raised position of frame 12 corresponds to the solid-line representation, while the lowered position of frame 12 corresponds to the dashed-line representation. FIG. 6c illustrates the lowered position of frame 12.

Piston 19 is coupled to lever 21 by way of pivot 52. Lever 21 is coupled to torsion axle 60. Torsion axle 60 is coupled to lever 64, which is coupled to frame 12 by way of pivot 66 which is fixed to frame 12. As piston 19 retracts, as illustrated in FIG. 6b, lever 21 imparts rotational force on torsion axle 60 which pivots about pivot 66 by way of lever 64. The rotation of torsion axle 60 imparts rotational force on torsion arm 62, which causes wheel hub spindle 15 and wheel 14 to rise relative to frame 12. As illustrated in FIG. 6c, with piston 19 retracted either completely or nearly completely, wheel hub spindle 15 is approximately equal in height with frame 12, compared with being distinctly lower than frame 12 in FIG. 6a. Different heights of wheel hub spindle 15 relative to frame 12 are envisioned in alternative embodiments.

In various embodiments, a difference in length between lever 21 and torsion arm 62 imparts a variable difference in the degree to which wheel hub spindle 15 and wheel 14 rise or fall based on the action of piston 19. Where torsion arm 62 is relatively longer than illustrated or lever 21 is relatively shorter than illustrated, wheel 14 may rise or fall by greater amounts than illustrated without changing characteristics of piston 19. The corollary applies, wherein a shorter torsion arm 62 and a longer lever 21 may result in wheel 14 rising and falling by lesser amounts than illustrated. However, varying the length of either lever 21 or torsion arm 62 may change the amount of force required from piston 19 in order to raise or lower wheel 14. As such, in various embodiments, piston 19 and lengths of lever 21 and torsion arm 62 may be selected to improve an efficiency between performance of piston 19 and movement of wheel 14. In an embodiment, piston 19 has five and one-half inches (5½") of travel, lever 21 is four and three-fourths inches (4¾") long and torsion arm 62 is six inches (6") long.

FIG. 7 is a perspective image of trailer suspension 16 and connecting mechanism 18. Piston 19 is partially visible and is connected to lever 21 by way of pivot 52. Lever 21 is connected to torsion axle 60, which is coupled to lever 64. Lever 64 is coupled to pivot 66 which is fixed to frame 12. Torsion arm 62, partially obscured, is connected to torsion axle 60, and wheel hub spindle 15 is connected to torsion arm 62. Wheel 14, not shown, spins about wheel hub spindle 15.

FIG. 8 shows trailer hitch 20. The solid line representation shows trailer hitch 20 in its closed position. The dashed line representation shows trailer hitch 20 in its open configuration.

As described above, arms 22, 24 are pivotally attached to frame 12 by pivots 26, 28 held by pins 23, 25. Arms 22, 24 may be secured to one another by removable pins 70. With arms 22, 24 joined together and pins 23, 25, 70 inserted, hitch 20 may be resilient enough to allow a vehicle to be joined with trailer hitch 20 at ball hitch 72, which may allow the vehicle to tow trailer 10.

With removable pins 23, 25 removed and pins 70 removed, arms 22, 24 may swing on pivots 26, 28 to the open position. Arms 22, 24 may be supported in the open position by support wheels 27, 29. In various embodiments, arms 22, 24 swing open by varying amounts. In an embodiment, arms 22, 24 swing open just sufficiently far enough to create a gap sufficient to allow the passage of amphibious aircraft 40. In alternative embodiments, arms 22, 24 may swing open wider, in various embodiments until arms 22, 24 are flush or approximately flush with frame 12.

Figure 9:
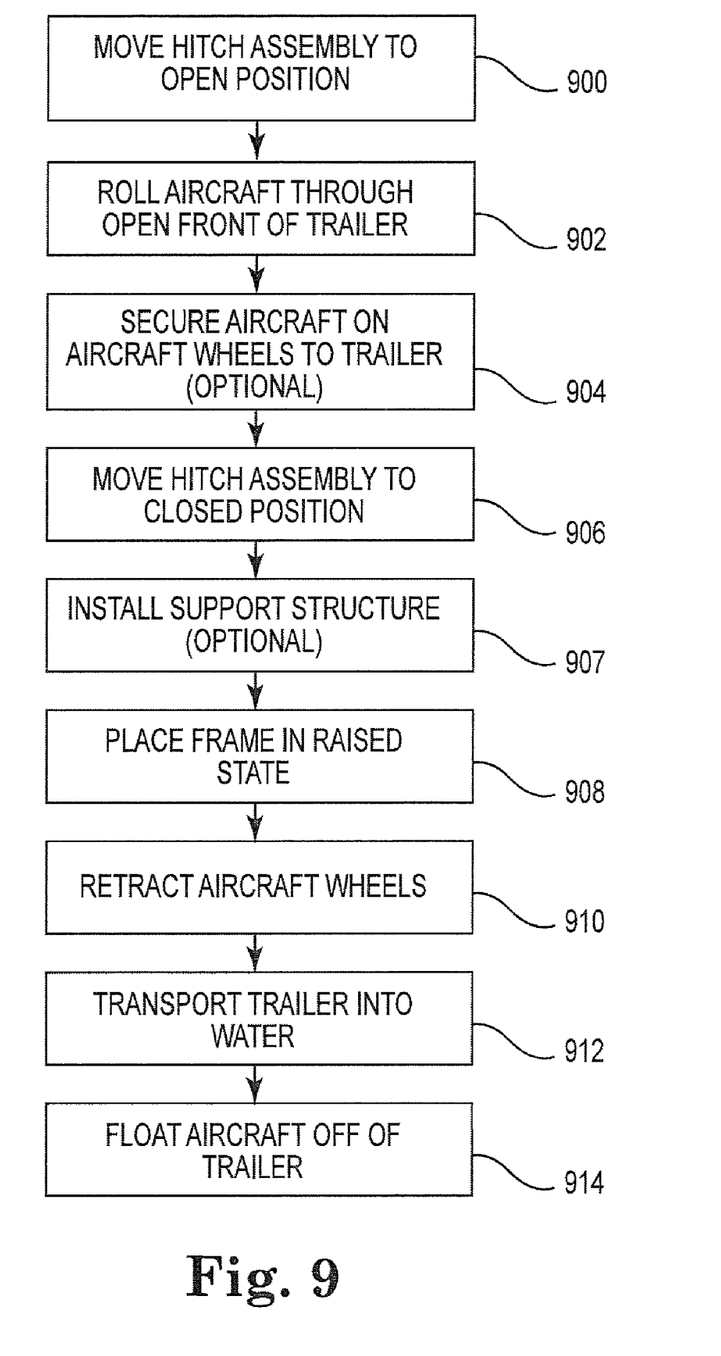
FIG. 9 is a flowchart for using a trailer to transport an amphibious aircraft from land to water.

FIG. 9 is a flowchart showing the process by which trailer 10 may be utilized to load and transport amphibious aircraft 40 from land into water. If hitch assembly 20 is not already in an open position, hitch assembly 20 is moved (900) into its open position by removing the removable pins 23, 25 and pins 70 and swinging arms 22, 24 about pivots 26, 28 to an open position. With wheels 44 deployed, amphibious aircraft 40 may then be rolled (902) through open front 32 of trailer 10 by rolling amphibious aircraft 40 over trailer 10. Amphibious aircraft 40 may optionally be secured (904) to trailer 10. Hitch assembly 20 may be moved (906) into its closed position by closing arms 22, 24 and inserting removable pins 23, 25 and pins 70. Optionally, support structure 13 may be installed (907). Then frame 12 is placed (908) into its raised position by operating piston 19.

After amphibious aircraft 40 is rolled over frame 12 in step (902) and, optionally, support structure 13 put back in place (907), wheels 44 are retracted (910). Trailer 10 may then be transported (912) into water and amphibious aircraft 40 may be floated (914) off of trailer 10. In various embodiments, amphibious aircraft may be floated off of trailer 10 by floating over the rear of trailer 10.

Figure 10:
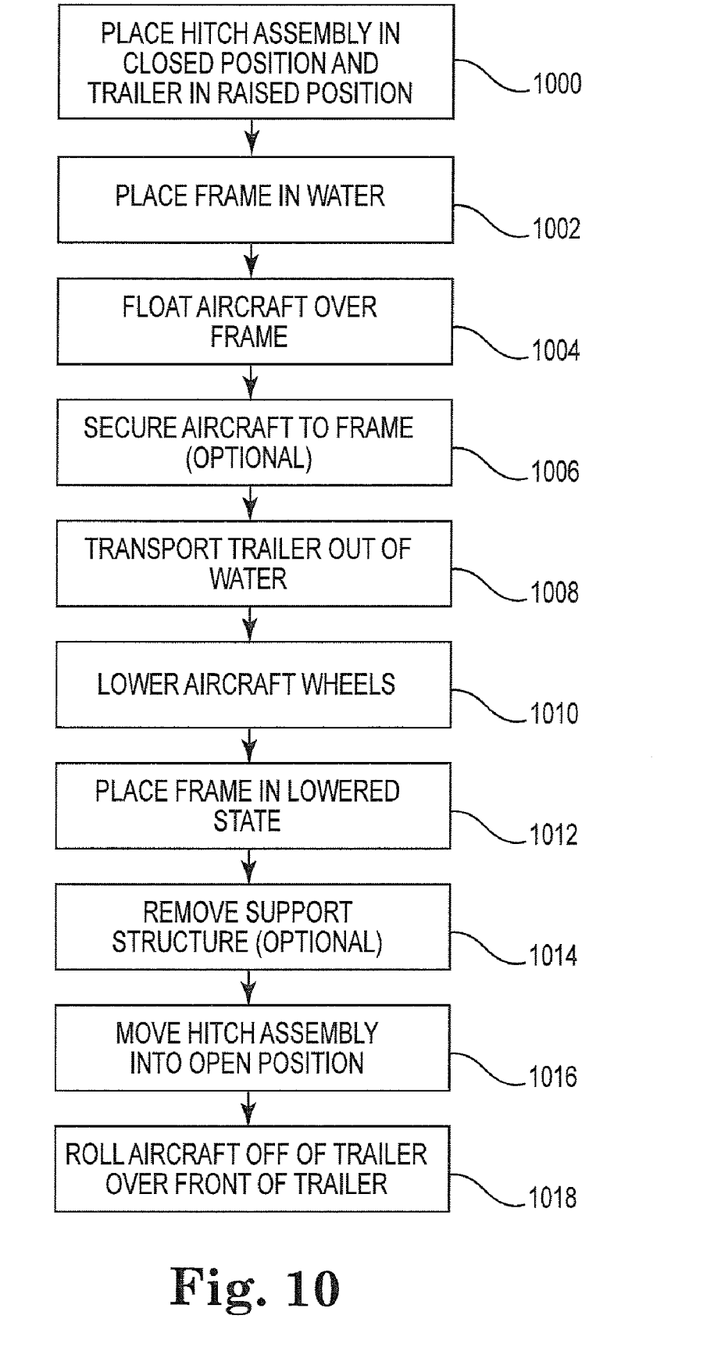
FIG. 10 is a flowchart for using a trailer to transport an amphibious aircraft from water to land.

FIG. 10 is a flowchart showing the process by which amphibious aircraft 40 may be removed from water using trailer 10. If hitch assembly 20 is not already in a closed position and trailer 10 not already in a raised position, hitch assembly 20 is placed (1000) in a closed position and piston 19 manipulated to raise frame 12. Frame 12 is then placed (1002) into water, by rolling it into water or by some other method. Amphibious aircraft 40 may then be floated (1004) over frame 12 and, optionally, secured (1006) to frame 12.

Trailer 10 may then be transported (1008) out of water. Once out of water and placed near a spot in which amphibious aircraft is to be moved, aircraft retractable wheels 44 may be lowered (1010) and frame 12 is moved (1012) to a lowered position. Hitch assembly is moved (1016) into its open position and, optionally, support structure 13 (1014) is removed. After this, amphibious aircraft 40 may be rolled (1016) on its wheels 44 off of trailer 10 over front 32 of frame 12.

Thus, embodiments of the devices, system and methods of the airplane trailer are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A trailer for an airplane having a flotation hull and having retractable airplane wheels, comprising:
    a frame having a front and a rear;
    a trailer suspension;
    trailer wheels mounted with respect to said trailer suspension;
    a connecting mechanism coupling said frame to said trailer suspension, said connecting mechanism allowing said frame to be movable between a raised position of said frame relative to said trailer wheels and a lowered position of said frame relative to said trailer wheels;
    said raised position being suitable for towing said airplane on said airplane trailer on a roadway;
    said lowered position being suitable for allowing said airplane wheels to be in contact with a common surface with said trailer wheels when said airplane is loaded onto said trailer;
    a hitch assembly coupled to said front of said frame, said hitch assembly having a closed position and an open position;
    said closed position being suitable for towing said trailer with said frame in said raised position;
    said open position allowing said airplane to be loaded/unloaded on land from said front of said frame when said frame is in said lowered position;
    wherein said trailer is constructed such that said airplane may be loaded/unloaded from said rear of said frame when said airplane trailer is placed in water;
    wherein said hitch assembly is movable to said open position;
    wherein said hitch assembly is movable to a first side of said frame to said open position;
    wherein said hitch assembly is pivotally coupled to said frame; and
    wherein said hitch assembly comprises a first arm pivotally coupled to said frame and a second arm pivotally coupled to said frame and detachably attached to said first arm, wherein said first arm and said second arm are movable to said open position when said first arm is detached from said second arm.

2. The airplane trailer of claim 1 wherein said frame has a second side, and wherein said first arm is movable to said first side to said open position and said second arm is movable to said second side to said open position.

3. The airplane trailer of claim 1 wherein said connecting mechanism comprises:
    a piston pivotally coupled to said frame and providing a piston force;
    a suspension lever operatively coupled to said trailer suspension; and
    a transfer lever pivotally operatively coupled to said piston and pivotally coupled to said suspension lever;
    wherein said frame moves between said raised position and said lowered position due to an action of said piston force on said transfer lever.

4. The airplane trailer of claim 3 wherein said piston is a hydraulic piston.

5. The airplane trailer of claim 3 wherein said suspension lever length and said transfer lever length are selected to achieve an advantage in efficiency of moving said frame from said raised position to said lowered position.

6. The airplane trailer of claim 3 wherein said frame is at least eight (8) inches higher above said trailer wheels in said raised position compared with said lowered position.

7. The airplane trailer of claim 1 wherein said connecting mechanism operates independently of said trailer suspension.

8. The airplane trailer of claim 1 wherein a raised performance of said trailer suspension with said frame in said raised position approximately equals a lowered performance of said trailer suspension with said frame in said lowered position.

9. The airplane trailer of claim 1 wherein said trailer suspension comprises a torsion axle.

10. The airplane trailer of claim 1 wherein said airplane has retractable wheels, wherein said airplane wheels are in contact with a common surface with said trailer wheels when said frame is in said lowered position and said retractable wheels are in an extended position.

11. The airplane trailer of claim 10 wherein said raised portion is suitable for towing said airplane on said airplane trailer on a roadway when said retractable wheels of said airplane are in a retracted position.

12. The airplane trailer of claim 10 wherein retractable wheels of said airplane interfere with loading/unloading of said airplane from said front of said trailer when said retractable wheels are in said extended position and said hitch assembly is in said closed position.

13. The airplane trailer of claim 12 wherein retractable wheels of said airplane clear said hitch assembly during loading/unloading of said airplane from said front of said trailer when said retractable wheel are in said extended position and said hitch assembly is in said open position.

* * * * *